United States Patent [19]

Thornton

[11] 4,371,439

[45] Feb. 1, 1983

[54] CAM ACTUATED FILTER ASSEMBLY

[75] Inventor: Donald I. Thornton, Warwick, R.I.

[73] Assignee: Fram Corporation, East Providence, R.I.

[21] Appl. No.: 273,163

[22] Filed: Jun. 12, 1981

Related U.S. Application Data

[63] Continuation of Ser. No. 147,979, May 8, 1980, abandoned.

[51] Int. Cl.³ ............................................. B01D 27/08
[52] U.S. Cl. .................................. 210/232; 210/443; 279/114; 269/287
[58] Field of Search ............... 210/168, 232, 233, 238, 210/243, 244; 269/287, 288; 279/110, 114

[56] References Cited

U.S. PATENT DOCUMENTS

| 894,781 | 7/1908 | Porter | 279/114 |
| 932,709 | 8/1909 | Johnson | 279/110 |
| 953,971 | 4/1910 | Nonneman | 279/114 |
| 1,350,746 | 8/1920 | Spillman | 279/114 |
| 1,456,525 | 5/1923 | West | 279/114 |
| 2,780,470 | 2/1957 | Ridout | 279/114 |
| 2,793,042 | 5/1957 | Candee | 279/110 |
| 2,817,533 | 12/1957 | Herbst | 279/114 |
| 3,025,743 | 3/1962 | Cecchi | 279/114 |
| 3,399,776 | 9/1968 | Knuth | 210/444 |
| 3,490,594 | 1/1970 | Hutchins | 210/232 |

FOREIGN PATENT DOCUMENTS 583195 12/1946 United Kingdom ............... 279/114

Primary Examiner—Ernest G. Therkorn
Attorney, Agent, or Firm—Ken C. Decker; William N. Antonis

[57] ABSTRACT

A filter assembly includes a housing for releasably locking to a base for enclosing a replaceable filter element. The base includes a support over which the housing is positioned. The support includes a plurality of radially extending guide pins. A plurality of radially movable jaws are mounted on the guide pins to releasably lock the housing to the base. A rotatable cam ring is coaxially mounted on the support and includes cam slots for receiving corresponding axially extending cam engaging portions of the jaws. The jaws move radially inwardly and outwardly to lock and unlock the housing from the base in response to rotation of the cam ring.

4 Claims, 4 Drawing Figures

CAM ACTUATED FILTER ASSEMBLY

This is a continuation of application Ser. No. 147,979, filed May 8, 1980, now abandoned.

BACKGROUND OF THE INVENTION

This invention relates to a heavy duty oil filter assembly with a cam actuated locking mechanism.

With most vehicle oil filters, the cannister, as well as the enclosed filter element, must be replaced when it is time to replace the oil filter during a program of periodic maintenance. With filters in which only the filter element need be replaced, such as disclosed in U.S. Pat. No. 3,490,594, special tools are required to remove the filter element from the cannister. Accordingly, an oil filter assembly in which the filter element may be quickly and easily replaced by a vehicle operator without the use of specialized tools is desirable.

SUMMARY OF THE INVENTION

An advantage of the present invention is that it provides a simple filter assembly within which a filter element may be replaced without the use of specialized tools.

Another advantage of this invention is that it provides a filter assembly with a removable housing which may be locked or unlocked by the rotation of a cam ring.

These advantages are achieved according to the applicant's invention in that there is herein provided a filter assembly with a housing which may be releasably locked onto a base to enclose a replaceable filter element. The base includes fluid inlets and outlets which channel fluid through the filter element. The base includes a support which is bolted to a foundation. Radially extending guide pins are press-fitted into bores in the support. A plurality of jaws are mounted to slide radially over the guide pins to lock and unlock the housing against the support. The jaws include axially extending cam engaging pins. A cam ring is coaxially mounted for rotation relative to the support and includes a plurality of cam slots which receive and cooperate with the cam engaging pins so that the jaws move radially inwardly and outwardly in response to rotation of the cam ring.

DETAILED DESCRIPTION

Figure 1:
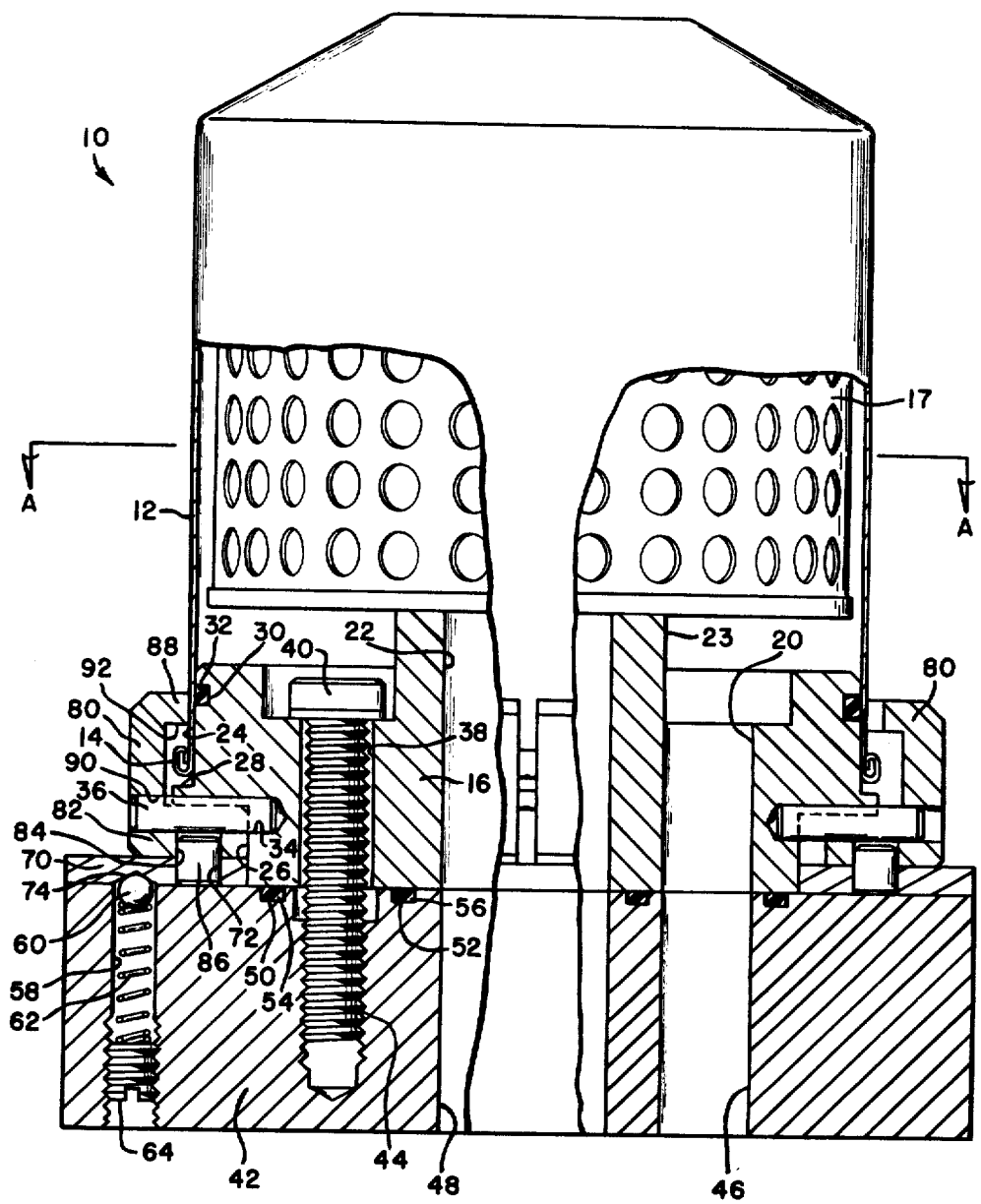
FIG. 1 is a sectional view of applicant's filter assembly.
Figure 2:
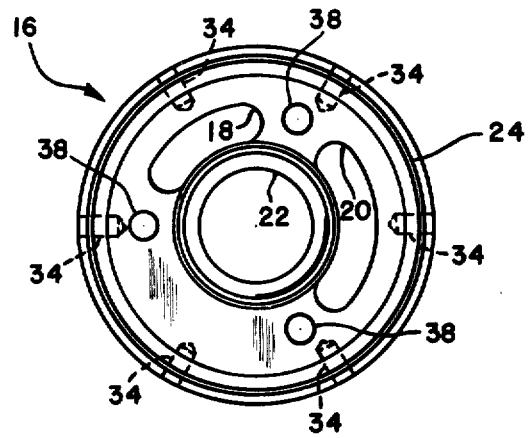
FIG. 2 is an isolated top view of the base portion of applicant's filter assembly in the direction of arrow A of FIG. 1.
Figure 3:
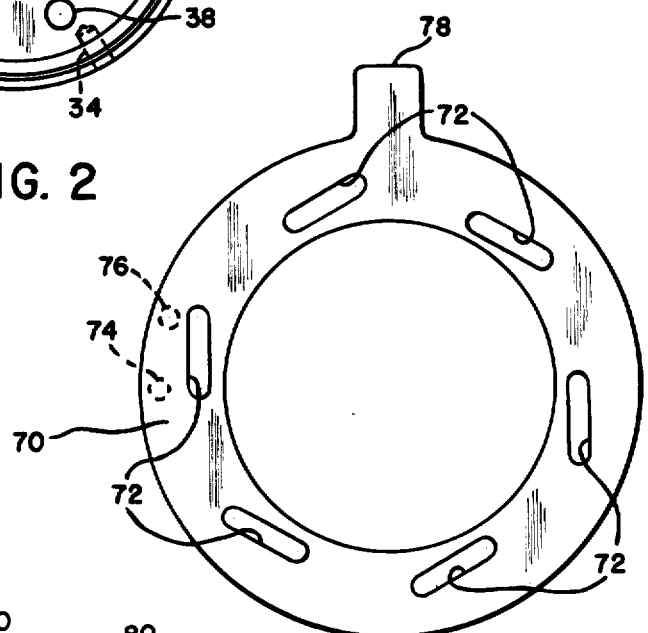
FIG. 3 is an isolated top view of the cam ring portion of applicant's filter assembly in the direction of arrow A in FIG. 1.
Figure 4:
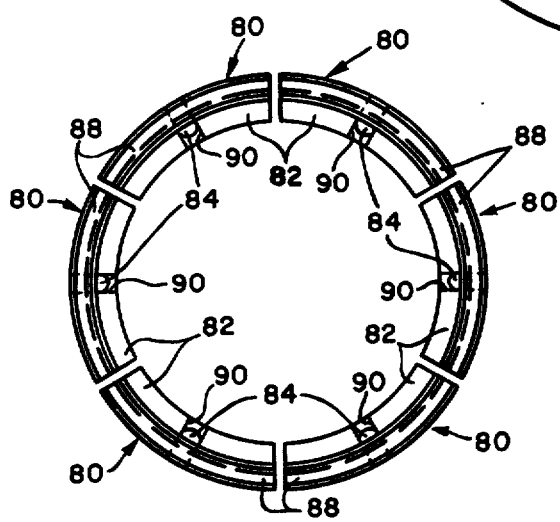
FIG. 4 is an isolated top view of the jaws of applicant's filter assembly in the direction of arrow A in FIG. 1.

A filter assembly 10 includes a housing 12 with a rolled bottom shoulder 14 for mounting over a generally cylindrical base member 16 to enclose a replaceable filter element 17 therewithin. Base member 16 includes a pair of inlet passages 18 and 20, of which only inlet passage 20 is visible in the view of FIG. 1. Base 16 also includes an outlet passage 22. Surface 23 of base member 16 cooperates with filter 17 so that oil flowing from inlets 18 and 20 to outlet 22 must pass through filter element 17. Base 16 includes a large diameter portion 24 separated from a small diameter portion 26 by a flange 28. Annular groove 30 in portion 24 contains an O-ring seal 32 which seals between base 16 and housing 12. Six radial bores 34 for receiving press-fitted guide pins 36 extend radially into base member 16. Three mounting bores 38 extend axially through base 16. Bolts 40 extend through mounting bores 38 to bolt base member 16 to a support member 42 threaded at 44.

Support member 42 may be permanently fixed to a vehicle engine block (not shown). Support 42 includes a pair of inlets 46, of which only one is visible in FIG. 1 which communicate oil from the engine block to the filter element 17 via base inlet passages 18 and 20. Outlet passage 48 communicates oil from filter 17 back into the engine block via base outlet passage 22. Filter element 17 is constructed, in a manner well known in the art, so that fluid entering via inlets 18 and 20 must pass through the filter element 17 in order to reach the outlet 22. Support member 42 also includes a pair of annular slots 50 and 52 which contain O-ring seals 54 and 56 to prevent oil leakage from between the support member 42 and the base member 16. Support member 42 also includes a partially threaded axial bore 58 which contains a locking ball 60. Ball 60 is urged upwardly viewing FIG. 1, by a spring 62. The bias of spring 62 may be adjusted by screw 64.

An annular cam ring 70 rests against support member 42 and is coaxially mounted around smaller diameter portion 26 of base member 16. Six generally oblong cam slots 72 extend axially through cam ring 70. A pair of detents 74 and 76, of which only 74 is visible in FIG. 1, are adapted to releasably receive locking ball 60. A tab 78 may be grasped to manually rotate cam ring 70.

Six arcuate jaws 80 fit coaxially end-to-end around base member 16. Each jaw 80 includes a base portion 82 with an axial bore 84 which receives a press-fitted cam pin 86. Cam pins 86 are slidably received by cam slots 72 of cam ring 70. Each jaw 24 also includes a housing engaging portion 88 which urges housing 12 against O-ring seal 32 when the jaws are in the locked position shown in the left half of FIG. 1. Each jaw 80 also includes an axial bore 90 which slidably receives a corresponding one of guide pins 36. Downward-facing abutment surface 92 cooperates with shoulder 14 of housing 12 to prevent removal of the housing 12 from the base member 16 when the jaws 24 are in the locked position. A suitable bearing material, such as Teflon, may be used as a coating on the various sliding surfaces of the support 42, the base 16, the cam ring 70, and of the jaws 80.

MODE OF OPERATION

In operation, the filter assembly 10 is assembled by moving housing 12 downward, viewing FIG. 1, over base 16 until shoulder 14 moves past housing engaging portions 88 of jaws 80. The housing 12 may then be locked to the base 16 by rotating cam ring 70 clockwise (viewing in the direction of arrows A of FIG. 1.) The clockwise rotation of cam ring 70 and the cooperation of cam pins 86 and cam slots 72 forces the pins 86 and the jaws 80 to slide radially inwardly along guide pins 36 to a locked position wherein portion 88 of jaws 80 press housing 12 sealingly against cylindrical surface 24 of base 16 and against O-ring seal 32. In this locked position, shown in the left half of FIG. 1, the housing shoulder 14 and the abutment surfaces 92 cooperate to prevent removal of the housing 12 from the base 16. Also, in the locked position ball 60 is received by detent 74 and the ball 60 and the detent 74 cooperate to hold cam ring 70 in the locked position.

When it is desired to replace the filter element 17, the cam ring 70 is rotated counterclockwise to force cam pins 86 and jaws 80 radially outwardly to an unlocked position shown in the right hand half of FIG. 1. In the unlocked position detent 76 receives ball 60 and detent 76 and ball 60 cooperate to hold cam ring 70 in the unlocked position. In the unlocked position portion 88 of jaws 80 are separated sufficiently from cylindrical base surface 24 to permit housing 12 to be removed from base 16 so that the filter element 17 may be replaced.

I claim:

1. A filter assembly comprising:
 a housing within which a filter element is disposed;
 a support for sealingly receiving the housing to enclose said filter element therebetween, said support carrying a plurality of radially outwardly projecting members;
 a plurality of circumferentially extending jaws carried by said support and circumscribing said support and said housing for clamping the housing against the support, each of said jaws having radially extending bores slidably receiving a corresponding one of the radially projecting members to thereby mount the jaws for radial movement toward and away from clamping engagement with said housing;
 a cam member mounted for rotation relative to the support and having a slot for each of said jaws, each of said jaws further including an axially extending projection engaging a corresponding slot in said cam member, the slots in said cam member being oriented to move the axially extending projections and therefore said jaws radially along said radially projecting members upon rotation of said camming member.

2. The filter assembly of claim 1, wherein:
 the housing comprises a shoulder on its periphery; and
 each jaw comprises a recess for receiving the shoulder and an abutment adjacent the recess, the abutment and the shoulder cooperating to prevent removal of the housing from the base when the jaws are in a locking position.

3. The filter assembly of claim 1, wherein:
 the housing comprises an inner surface engageable with the support and an outer surface engageable with the jaw, the jaw and the support cooperating to hold the housing therebetween under radial compression when the jaws are in a locked position.

4. The filter assembly of claim 1, wherein:
 the cam member comprises an annular disc coaxially mounted on the support, the disc including a plurality of slots defiined therewithin, each slot receiving a corresponding cam engaging portion of one of the jaws.

* * * * *